(12) United States Patent
Tokuno et al.

(10) Patent No.: US 11,286,953 B2
(45) Date of Patent: Mar. 29, 2022

(54) BLOWER

(71) Applicant: Nidec Corporation, Kyoto (JP)

(72) Inventors: Yuta Tokuno, Kyoto (JP); Hideki Aoi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 78 days.

(21) Appl. No.: 16/689,185

(22) Filed: Nov. 20, 2019

(65) Prior Publication Data

US 2020/0208653 A1 Jul. 2, 2020

(30) Foreign Application Priority Data

Dec. 28, 2018 (JP) .............................. JP2018-248649

(51) Int. Cl.
  *F04D 29/52* (2006.01)
  *H02K 7/14* (2006.01)
  (Continued)

(52) U.S. Cl.
  CPC ......... *F04D 29/522* (2013.01); *F04D 19/002* (2013.01); *F04D 25/0613* (2013.01);
  (Continued)

(58) Field of Classification Search
  CPC .. F04D 19/002; F04D 25/0613; F04D 25/082; F04D 29/5813; F04D 29/522;
  (Continued)

(56) References Cited

U.S. PATENT DOCUMENTS 7,345,884 B2 * 3/2008 Horng .................. F04D 29/582
  165/104.33
7,442,005 B2 * 10/2008 Yeh ....................... F04D 19/002
  310/401

(Continued)

FOREIGN PATENT DOCUMENTS

| JP | 04-36098 A | 2/1992 |
| JP | 2007-138927 A | 6/2007 |
| TW | 200540338 A | 12/2005 |

OTHER PUBLICATIONS

Official Communication issued in corresponding Chinese Patent Application No. 201911309937 6, dated Jun. 11, 2021.

*Primary Examiner* — Devon C Kramer
*Assistant Examiner* — Joseph S. Herrmann
(74) *Attorney, Agent, or Firm* — Keating & Bennett, LLP

(57) ABSTRACT

A blower includes a moving blade, a motor, and a housing. The housing includes a holding portion located below the moving blade to hold the motor, and a peripheral wall portion having a cylindrical shape centered on the central axis and extending upward from a radially outer end portion of the holding portion. The peripheral wall portion includes a peripheral wall recess that is recessed downward from an upper end portion of the peripheral wall portion and connects a space radially inside of the peripheral wall portion and a space radially outside of the peripheral wall portion, and includes a first peripheral surface facing one circumferential direction that is opposite to a rotation direction of the moving blade. The first peripheral surface extends in one (Continued)

circumferential direction from the upper end of the peripheral wall recess toward the lower side.

9 Claims, 13 Drawing Sheets

(51) Int. Cl.
    *H02K 5/04*     (2006.01)
    *H02K 5/24*     (2006.01)
    *F04D 19/00*     (2006.01)
    *H02K 9/06*     (2006.01)
    *F04D 25/06*     (2006.01)
    *F04D 29/58*     (2006.01)
    *F04D 25/08*     (2006.01)
    *F04D 29/70*     (2006.01)
    *F04D 29/66*     (2006.01)
    *F04D 29/42*     (2006.01)

(52) U.S. Cl.
    CPC ....... *F04D 25/082* (2013.01); *F04D 29/4253* (2013.01); *F04D 29/5813* (2013.01); *F04D 29/667* (2013.01); *F04D 29/70* (2013.01); *H02K 5/04* (2013.01); *H02K 5/24* (2013.01); *H02K 7/14* (2013.01); *H02K 9/06* (2013.01)

(58) Field of Classification Search
    CPC ............... F04D 19/022; F04D 25/0646; F04D 29/4226; F04D 29/4253; F04D 29/70; F04D 29/666; F04D 29/667; H02K 5/04; H02K 7/17; H02K 5/24; H02K 9/06
    See application file for complete search history.

(56) References Cited

U.S. PATENT DOCUMENTS

| | | | | |
|---|---|---|---|---|
| 7,775,767 | B2* | 8/2010 | Takemoto | F04D 29/542 415/211.2 |
| 8,172,553 | B2* | 5/2012 | Horng | F04D 25/0633 417/354 |
| 9,388,824 | B2* | 7/2016 | Yin | F04D 29/083 |
| 2005/0265828 | A1 | 12/2005 | Horng et al. | |
| 2007/0116564 | A1 | 5/2007 | Hsu et al. | |
| 2010/0033041 | A1 | 2/2010 | Watanabe et al. | |

* cited by examiner

BLOWER

CROSS REFERENCE TO RELATED APPLICATION

The present application claims priority under 35 U.S.C. § 119 to Japanese Application No. 2018-248649 filed on Dec. 28, 2018 the entire contents of which are hereby incorporated herein by reference.

1. FIELD OF THE INVENTION

The present disclosure relates to a blower.

2. BACKGROUND

There has heretofore been known a blower that blows air with a motor rotating moving blades. In order to rotate the moving blades at a higher speed and increase the amount of air blown from the blower, it is required to increase a drive current of the motor, which, however, leads to temperature rises in electronic components mounted on a substrate, a coil of a stator, and the like in the motor. In view of this, a technique has been proposed to cool the electronic components, the coil, and the like in the motor by flowing air into the motor.

For example, a conventional motor fan generates negative pressure in a gap between a stator frame and a rotor frame by the rotation of a fan blade. Thus, air flows into the motor through an air inflow passage provided in a bottom wall portion of the rotor frame. In order to change the width dimension of the gap where the negative pressure is generated, a recess is formed at the end of a peripheral wall part of the stator frame of the motor.

When the recess is formed in the peripheral wall part, a part of the airflow that is sent out by the rotation of the moving blade and flows radially outward of the peripheral wall part hits the inner surface of the recess and flows into the peripheral wall part through the recess due to a pressure difference between the inside and outside of the recess. In this event, there is a possibility that noise may be generated in the recess due to turbulence of the airflow near the inner surface of the recess.

SUMMARY

An exemplary blower of the present disclosure includes a moving blade that is rotatable about a central axis extending in a vertical direction, a motor that rotates the moving blade, and a housing that surrounds the moving blade and the motor. The housing includes a holding portion and a peripheral wall portion. The holding portion is provided below the moving blade and holds the motor. The peripheral wall portion has a cylindrical shape centered on the central axis, and extends upward from a radially outer end portion of the holding portion. The peripheral wall portion includes a peripheral wall recess. The peripheral wall recess is recessed downward from the upper end portion of the peripheral wall portion, and connects a space radially inside of the peripheral wall portion and a space radially outside of the peripheral wall portion. The peripheral wall recess includes a first peripheral surface that faces one side in a circumferential direction that is opposite to the rotation direction of the moving blade. The first peripheral surface extends toward one side in the circumferential direction from the upper end of the peripheral wall recess toward the lower side.

The above and other elements, features, steps, characteristics and advantages of the present disclosure will become more apparent from the following detailed description of the example embodiments with reference to the attached drawings.

DETAILED DESCRIPTION

Figure 1A:
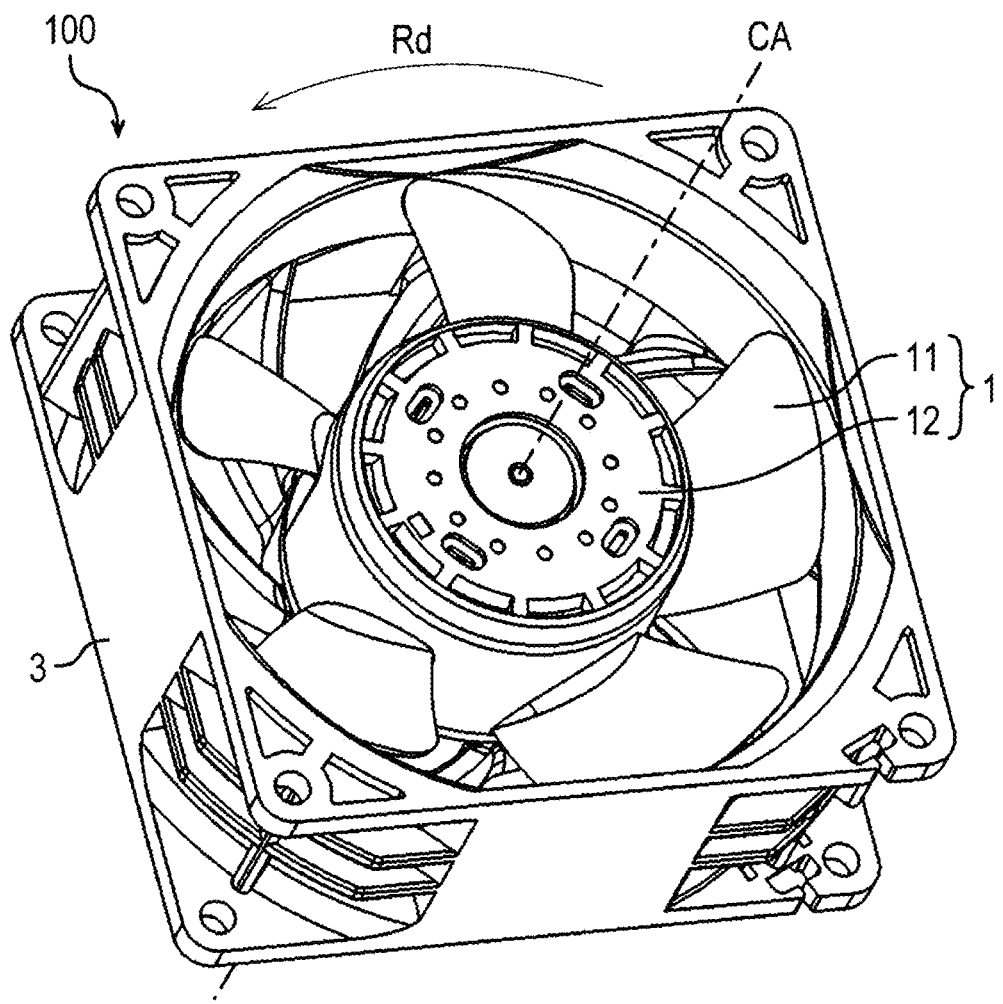
FIG. 1A is a perspective view of a blower according to an example embodiment of the present disclosure.

Example embodiments of the present disclosure will be described below with reference to the drawings.

In the present specification, as for a blower 100, a direction parallel to a central axis CA is referred to as an "axial direction". As for the axial directions, a direction from a stationary blade 32 to a moving blade 11 to be described later is referred to as "upward", while a direction from the moving blade 11 to the stationary blade 32 is referred to as "downward". In each component, an end portion on the upper side is referred to as an "upper end portion", while the position of the upper end portion in the axial direction is referred to as an "upper end". An end portion on the lower side is referred to as a "lower end portion", while the position of the lower end portion in the axial direction is referred to as a "lower end". On the surface of each component, a surface facing upward is referred to as an "upper surface", while a surface facing downward is referred to as a "lower surface".

A direction orthogonal to the central axis CA is referred to as a "radial direction". As for the radial directions, a direction approaching the central axis CA is referred to as "radially inward", while a direction away from the central axis CA is referred to as "radially outward". In each component, an end portion on the inner side in the radial direction is referred to as a "radially inner end portion", and the position of the radially inner end portion in the radial direction is referred to as a "radially inner end". On the other hand, an end portion on the outer side in the radial direction is referred to as a "radially outer end portion", and the position of the radially outer end portion in the radial direction is referred to as a "radially outer end". As for side surfaces of each component, a side surface facing inward in the radial direction is referred to as a "radially inner side surface", while a side surface facing outward in the radial direction is referred to as a "radially outer side surface".

A direction in which the moving blade 11 rotates about the central axis CA is referred to as a "circumferential direction". As for the circumferential direction, a direction in which the moving blade 11 rotates about the central axis CA is referred to as a "rotation direction Rd", while a direction opposite to the rotation direction Rd is referred to as "one circumferential direction Rb". The rotation direction Rd may be referred to as "the other circumferential direction". In each component, an end portion in the circumferential direction is referred to as a "circumferential end portion", and the position of the circumferential end portion in the circumferential direction is referred to as a "circumferential end". An end portion in one circumferential direction Rb is referred to as "one circumferential end portion", and the position of one circumferential end portion in the circumferential direction is referred to as "one circumferential end". An end portion in the other circumferential direction Rd is referred to as "the other circumferential end portion", and the position of the other circumferential end portion in the circumferential direction is referred to as "the other circumferential end". As for the side surfaces of each component, a surface facing in the circumferential direction is referred to as a "circumferential side surface". A side surface facing one circumferential direction Rb is referred to as "one circumferential side surface", while a side surface facing the other circumferential direction Rd is referred to as "the other circumferential side surface".

In this specification, "annular" means not only a shape that is continuous around the entire circumference in the circumferential direction about the central axis CA, but also an arc shape with a cut included in a part of the entire circumference about the central axis CA.

The names of directions, parts, positions, and surfaces described above and the definition of "annular" described above are definitions of names and shape for use in the description of this specification, and are not intended to limit any names and shapes when incorporated into actual devices.

In this specification, as for positional relationships between any one of azimuth, line, and surface and any other, "parallel" means not only a state where the two do not intersect at all no matter how much further the two extend, but also a state where the two are substantially parallel to each other. "Vertical" and "orthogonal" include not only the state in which they intersect each other at 90 degrees, but also the state in which they are substantially perpendicular and the state in which they are substantially orthogonal. That is, "parallel", "vertical", and "orthogonal" each includes a state where a positional relationship therebetween has a shift in angle that does not depart from the gist of the present disclosure.

When any one of azimuth, line, and surface intersects with any other and the angle made by the both is not 90 degrees, such a state is expressed as that the both intersect at an acute angle. This expression is synonymous with the fact that the both intersect at an obtuse angle, not to mention from a geometric point of view.

Figure 1B:
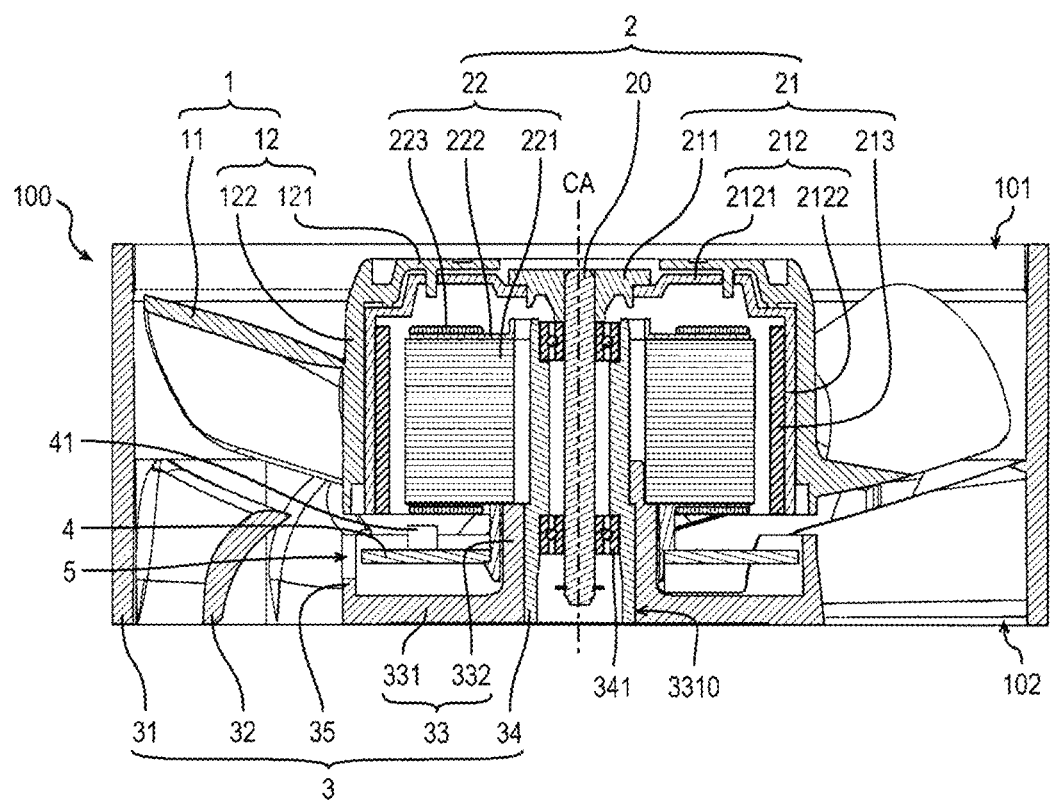
FIG. 1B is a cross-sectional view of a blower according to an example embodiment of the present disclosure.

FIG. 1A is a perspective view showing a blower 100 according to an example embodiment. FIG. 1B is a cross-sectional view showing the blower 100 according to the example embodiment. FIG. 1B shows a cross-sectional structure when the blower 100 is virtually cut along a flat surface including a central axis CA.

The blower 100 according to the example embodiment is an axial fan, which sends out air sucked from an intake port 101 downward from an exhaust port 102. As shown in FIGS. 1A and 1B, the blower 100 includes an impeller 1, a motor 2, a housing 3, and a substrate 4.

The impeller 1 is attached to a rotor 21 to be described later of the motor 2. The impeller 1 includes a moving blade 11 and a covered cylindrical impeller base 12.

The moving blade 11 is provided on the impeller base 12. The moving blade 11 is rotatable about the central axis CA extending in a vertical direction. The blower 100 includes the moving blade 11. The impeller base 12 has a base lid part 121 and a base cylindrical part 122. The base lid part 121 is annular and extends radially outward from a shaft holder 211 of the rotor 21 to be described later of the motor 2. The base cylindrical part 122 extends downward from a radially outer end portion of the base lid part 121.

The moving blade 11 is provided on the radially outer side surface of the base cylindrical part 122. More specifically, in the radial direction, the moving blade 11 extends from the radially outer side surface of the base cylindrical part 122 toward the radially outer side. The moving blade 11 may be a part of the rotor 21 without being limited to the example of this example embodiment. In this case, the moving blade 11 may be provided, for example, on the radially outer side surface of a holding member 212 to be described later of the rotor 21.

In the axial direction, the moving blade 11 extends in the rotation direction Rd toward the upper side. The moving blade 11 is rotated in the rotation direction Rd about the central axis CA by driving the motor 2 to send an airflow. The airflow swirls in the rotation direction Rd about the central axis CA and flows downward.

Figure 2:
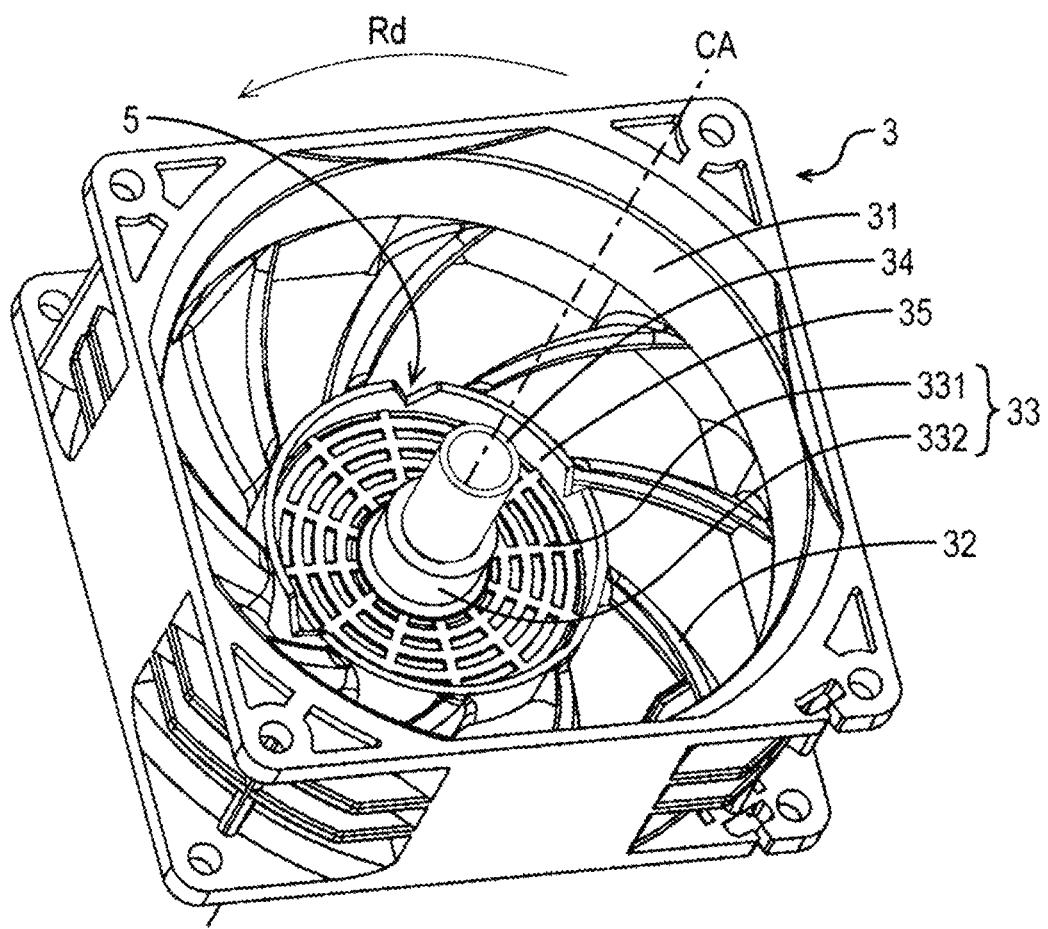
FIG. 2 is a perspective view of a housing.

The motor 2 rotates the moving blade 11. As described above, the blower 100 includes the motor 2. As shown in FIG. 2, the motor 2 includes a shaft 20, the rotor 21, and a stator 22.

The shaft 20 is the rotation axis of the rotor 21, which supports the rotor 21 and is rotatable with the rotor 21 about the central axis CA. The shaft 20 is not limited to the example of this example embodiment, and may be a fixed shaft attached to the stator 22. When the shaft 20 is a fixed shaft, a bearing (not shown) is provided between the rotor 21 and the shaft 20.

The rotor 21 is rotatable with the moving blade 11 about the central axis CA. The rotor 21 has the shaft holder 211, the covered cylindrical holding member 212, and a magnet part 213. The shaft holder 211 is annular and attached to the upper end portion of the shaft 20. The shaft holder 211 has its radially inner end portion fixed to the radially outer side surface of the shaft 20. The holding member 212 includes a rotor lid part 2121 and a rotor cylindrical part 2122. The rotor lid part 2121 is annular and extends radially outward from the shaft holder 211. The rotor cylindrical part 2122 extends downward from the radially outer end portion of the rotor lid part 2121. The impeller base 12 is attached to the holding member 212. The rotor lid part 2121 is connected to the base lid part 121. The radially outer side surface of the rotor cylindrical part 2122 is connected to the radially inner side surface of the base cylindrical part 122. The magnet part 213 is held on the radially inner side surface of the rotor cylindrical part 2122. The magnet part 213 is disposed on the radially outer side of the stator 22 and faces the radially outer side surface of the stator 22 with a gap in the radial direction.

The stator 22 has an annular shape centered on the central axis CA. The stator 22 rotates the rotor 21 when the motor 2 is driven. The stator 22 includes a stator core 221, an insulator 222, and a coil part 223. The stator core 221 is a magnetic body having an annular shape centered on the central axis CA, which is a laminated body having a plurality of electromagnetic steel plates laminated therein in this example embodiment. The stator core 221 has its radially inner end portion fixed to the radially outer side surface of a bearing holder 34 to be described later of the housing 3. The radially outer side surface of the stator core 221 faces the magnet part 213 in the radial direction with a gap therebetween. The insulator 222 is an electrical insulating member using a resin material or the like, and covers at least a part of the stator core 221. The coil part 223 is a winding member having a conducting wire wound around the stator core 221 with the insulator 222 interposed therebetween.

Next, the housing 3 will be described with reference to FIGS. 1A to 2. FIG. 2 is a perspective view of the housing 3.

The housing 3 surrounds the moving blade 11 and the motor 2. As described above, the blower 100 has the housing 3. The housing 3 includes a housing cylindrical part 31, a plurality of stationary blades 32, a holding part 33, a cylindrical bearing holder 34, and a peripheral wall part 35.

The housing cylindrical part 31 extends in the axial direction. The intake port 101 is provided at the upper end portion of the housing cylindrical part 31. The exhaust port 102 is provided at the lower end portion of the housing cylindrical part 31. The housing cylindrical part 31 houses therein the impeller 1, the motor 2, the stationary blade 32, the holding part 33, and the peripheral wall part 35.

The stationary blade 32 extends radially outward from the holding part 33 and is connected to the housing cylindrical part 31. In other words, the stationary blade 32 has its radially inner end portion connected to the radially outer side surface of the holding part 33. The stationary blade 32 has its radially outer end portion connected to the radially inner side surface of the housing cylindrical part 31. In the axial direction, the stationary blade 32 is disposed below the moving blade 11 and extends in the rotation direction Rd of the moving blade 11 toward the lower side. The stationary blade 32 is tilted in the opposite direction to the moving blade 11 as viewed from the radial direction.

The holding part 33 is provided below the moving blade 11 and holds the motor 2. As described above, the housing 3 has the holding part 33. The holding part 33 is supported by the housing cylindrical part 31 through the stationary blade 32. The holding part 33 includes a bracket 331 and a holding cylindrical part 332. The bracket 331 has an annular shape surrounding the central axis CA, and is disposed below the impeller 1 and the motor 2. The radially inner end portion of the stationary blade 32 is connected to the radially outer side surface of the bracket 331. The holding cylindrical part 332 has a cylindrical shape extending in the axial direction, and extends upward from the radially inner end portion of the bracket 331. A center hole 3310 is provided at the center of the bracket 331. The center hole 3310 passes through the bracket 331 in the axial direction and communicates with the inside of the holding cylindrical part 332. The bearing holder 34 is inserted into the center hole 3310 and the holding cylindrical part 332. The bearing holder 34 has its lower end portion connected to the radially inner side surface of the center hole 3310 and the radially inner side surface of the holding cylindrical part 332.

The bearing holder 34 has a cylindrical shape extending in the axial direction, and is supported by the bracket 331 and the holding cylindrical part 332. The bearing holder 34 holds the stator 22. The stator core 221 is fixed to the radially outer side surface of the bearing holder 34. The shaft 20 is inserted into the bearing holder 34. A bearing 341 is provided on the radially inner side surface of the bearing holder 34. The bearing holder 34 rotatably supports the shaft 20 via the bearing 341. The bearing 341 is a ball bearing in this example embodiment, but is not limited to this example and may be a sleeve bearing, for example.

The peripheral wall part 35 has a cylindrical shape centered on the central axis CA, and extends upward from the radially outer end portion of the holding part 33. As described above, the housing 3 has the peripheral wall part 35. The peripheral wall part 35 has a peripheral wall recess 5. The peripheral wall recess 5 is recessed downward from the upper end portion of the peripheral wall part 35. The peripheral wall recess 5 also connects a space radially inside of the peripheral wall part 35 and a space radially outside of the peripheral wall part 35. The peripheral wall recess 5 is a so-called notch provided in the upper end portion of the peripheral wall part 35 in this example embodiment.

A plurality of peripheral wall recesses 5 are provided in the circumferential direction. In this example embodiment, as shown in FIG. 2, intervals between the peripheral wall recesses 5 adjacent to each other in the circumferential direction are different. By providing the peripheral wall recesses 5 unevenly in the circumferential direction, the phase of a sound generated in each peripheral wall recess 5 is shifted when the moving blade 11 passes through each peripheral wall recess 5 in the rotation direction Rd. Therefore, it is possible to reduce pulsed noise generated by these sounds overlapping each other. However, the present disclosure is not limited to this example, and the peripheral wall recesses 5 may be evenly arranged in the circumferential direction. That is, the intervals between the peripheral wall recesses 5 adjacent to each other in the circumferential direction may be the same.

Next, the substrate 4 is electrically connected to the end portion of the conducting wire of the coil part 223 and to a connection wire (not shown) drawn out of the housing 3. In the axial direction, the substrate 4 is disposed below the motor 2 and the impeller 1 except for the lower portion of the insulator 222, and is disposed above the bracket 331 of the housing 3. In the radial direction, the substrate 4 is disposed radially inside of the peripheral wall part 35 of the housing 3 and is disposed radially outside of the holding cylindrical part 332 and the bearing holder 34 of the housing 3.

The substrate 4 has an electronic component 41. As described above, the blower 100 includes the substrate 4. The electronic component 41 is disposed radially inside of the peripheral wall part 35. The electronic component 41 is disposed above the bracket 331. Since the electronic component 41 faces the peripheral wall recess 5 in the radial direction, the airflow flowing into the space radially inside of the peripheral wall part 35 through the peripheral wall recess 5 is likely to hit the electronic component 41. Therefore, the electronic component 41 can be cooled with the airflow.

Figure 3A:
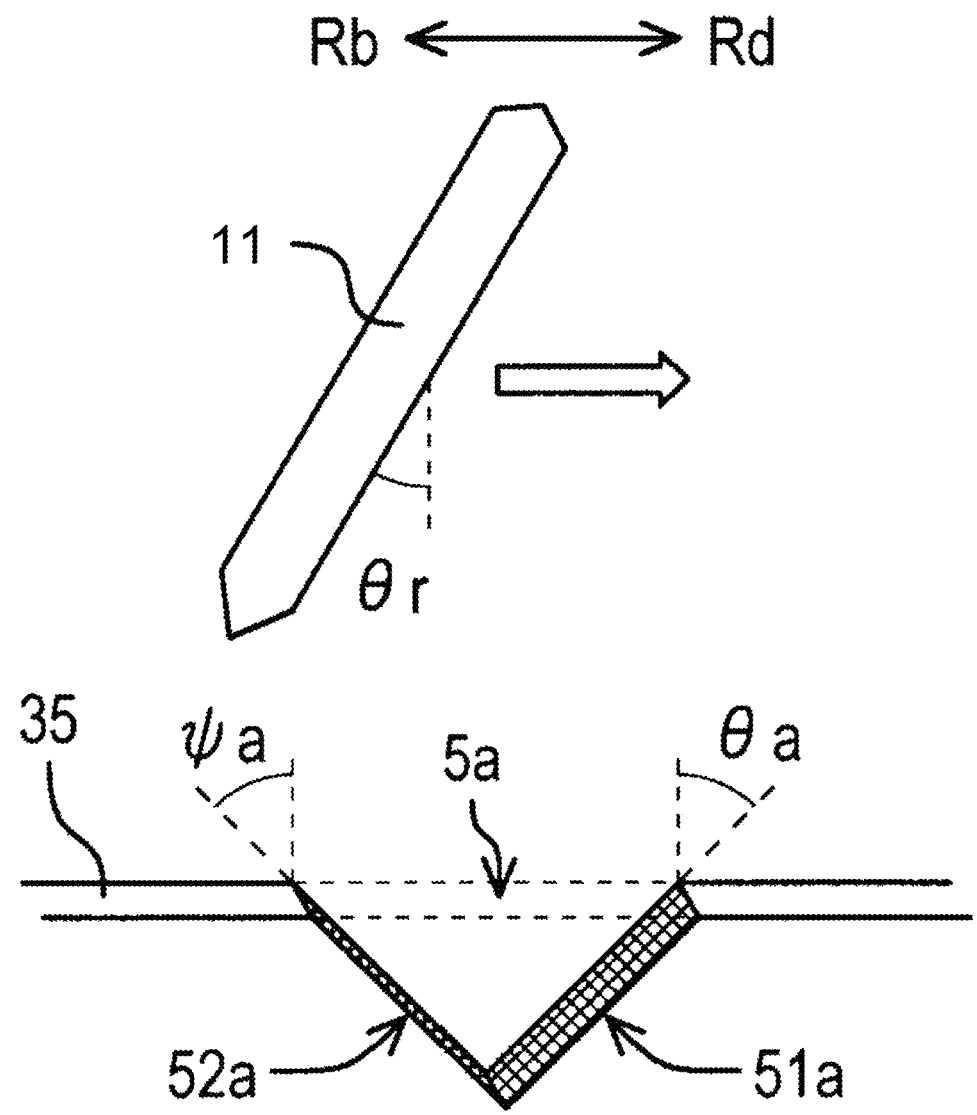
FIG. 3A is a perspective view showing a peripheral wall recess according to a first example of an example embodiment of the present disclosure.
Figure 3B:
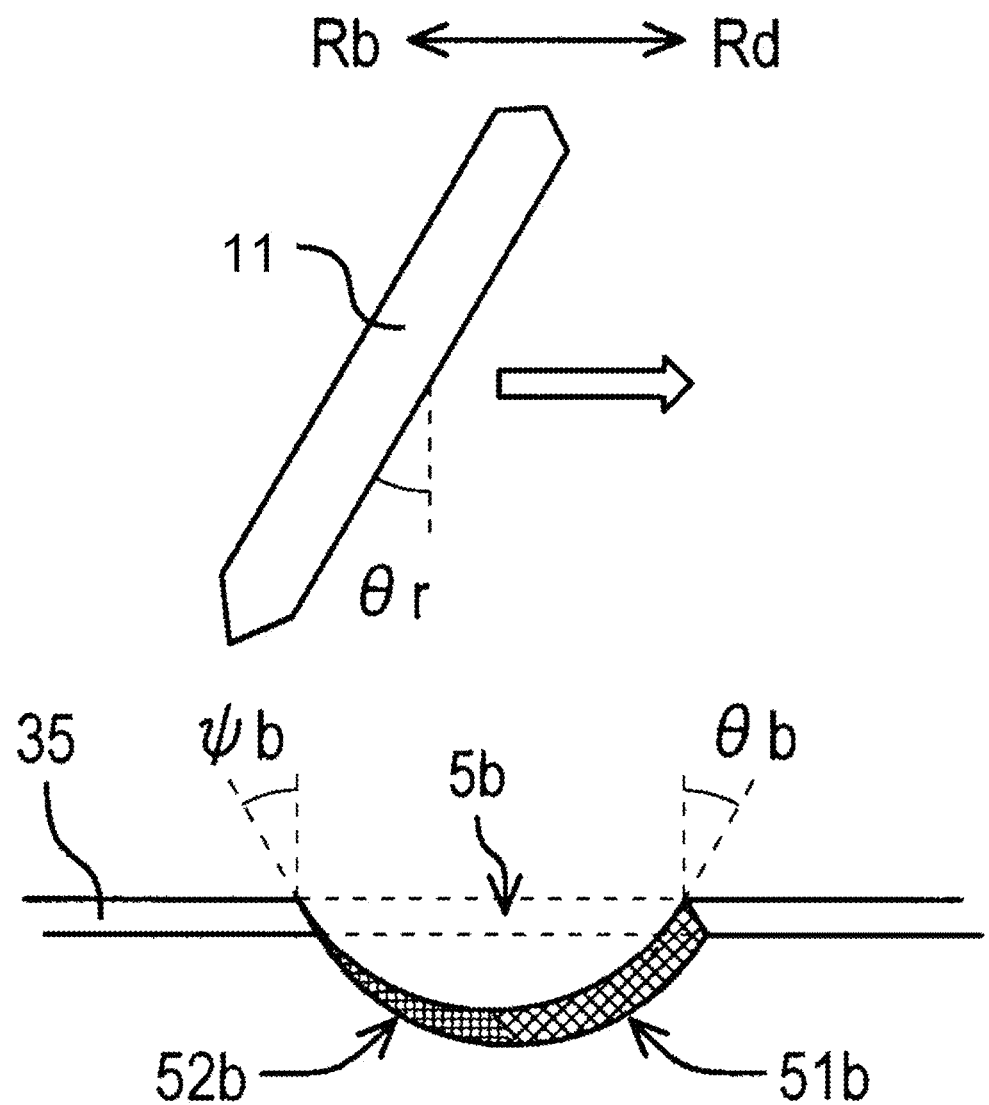
FIG. 3B is a perspective view showing a peripheral wall recess according to a second example of an example embodiment of the present disclosure.

Next, a configuration of the peripheral wall recess 5 will be described. FIG. 3A is a perspective view showing a peripheral wall recess 5a according to a first example. FIG. 3B is a perspective view showing a peripheral wall recess 5b according to a second example. In FIGS. 3A and 3B, the moving blade 11 and the peripheral wall recesses 5a and 5b are viewed from the radial direction and from above.

As shown in FIGS. 3A and 3B, the peripheral wall recesses 5a and 5b according to the first and second examples have first peripheral surfaces 51a and 51b. The first peripheral surfaces 51a and 51b are each one circumferential side surface facing one circumferential direction Rb that is opposite to the rotation direction Rd of the moving blade 11. The first peripheral surfaces 51a and 51b extend in one circumferential direction Rb toward the lower side from the upper ends of the peripheral wall recesses 5a and 5b.

The first peripheral surfaces 51a and 51b of the peripheral wall recesses 5a and 5b face in the opposite direction to the rotation direction Rd of the moving blade 11, and extend in the opposite direction toward the lower side from the upper ends of the peripheral wall recesses 5a and 5b; therefore, airflows hitting against the first peripheral surfaces 51a and 51b are likely to flow smoothly along the first peripheral surfaces 51a and 51b. Therefore, airflow turbulence can be suppressed around the first peripheral surfaces 51a and 51b. Therefore, it is possible to suppress the generation of noise due to the airflow flowing into the peripheral wall recesses 5a and 5b.

Molding of the housing 3 using a mold is facilitated. For example, the first peripheral surfaces 51a and 51b of the peripheral wall recesses 5a and 5b can be formed by removing the mold up and down during molding without using a mold having a complicated structure.

As shown in FIGS. 3A and 3B, the peripheral wall recesses 5a and 5b further include second peripheral surfaces 52a and 52b. The second peripheral surfaces 52a and 52b are the other circumferential side surfaces facing the other circumferential direction Rd, which is the same direction as the rotation direction Rd of the moving blade 11. The second peripheral surfaces 52a and 52b extend from one circumferential direction Rb to the other circumferential direction Rd toward the lower side from the upper ends of the peripheral wall recesses 5a and 5b.

The second peripheral surfaces 52a and 52b of the peripheral wall recesses 5a and 5b face the rotation direction Rd of the moving blade 11, and extend in the rotation direction Rd toward the lower side from the upper ends of the peripheral wall recesses 5a and 5b, thus making it likely for airflows flowing radially inward through the peripheral wall recesses 5a and 5b in the vicinity of the second peripheral surfaces 52a and 52b to flow smoothly along the second peripheral surfaces 52a and 52b. Therefore, airflow turbulence around the second peripheral surfaces 52a and 52b can be suppressed. Therefore, it is possible to suppress the generation of noise due to the airflow flowing into the peripheral wall recesses 5a and 5b.

Molding of the housing 3 using a mold is facilitated. For example, the second peripheral surfaces 52a and 52b of the peripheral wall recesses 5a and 5b can be formed by removing the mold up and down during molding without using a mold having a complicated structure.

In the first and second examples, the first peripheral surfaces 51a and 51b are each an example of the "first peripheral surface" of the present disclosure. The second peripheral surfaces 52a and 52b are each an example of the "second peripheral surface" of the present disclosure.

As shown in FIG. 3A, in the first example, the first and second peripheral surfaces 51a and 52a are flat surfaces tilted in opposite directions in the circumferential direction. The first peripheral surface 51a has its lower end portion connected to the lower end portion of the second peripheral surface 52a. That is, the peripheral wall recess 5a according to the first example is a so-called V-shaped notch.

As shown in FIG. 3A, the tilt direction of the first peripheral surface 51a is a direction perpendicular to the normal and radial directions of the first peripheral surface 51a. An acute angle θa made by the tilt direction of the first peripheral surface 51a with the axial direction is preferably greater than the acute angle θr made by the moving blade 11 with the axial direction. The acute angle θa of the first peripheral surface 51a is the tilt angle of the first peripheral surface 51a with respect to the axial direction. The acute angle θr of the moving blade 11 is a so-called lead angle. As viewed from the radial direction, the acute angle θr is an acute angle made by an imaginary line with the axial direction, the imaginary line connecting the upper end of the radially inner end portion of a positive pressure surface of the moving blade 11 to the lower end of the radially outer end portion of the positive pressure surface of the moving blade 11. Since the acute angle θa of the first peripheral surface 51a is greater than the acute angle θr of the moving blade 11, the airflow hitting against the first peripheral surface 51a is likely to flow more smoothly along the first peripheral surface 51a. Therefore, the generation of noise caused by the airflow flowing into the peripheral wall recess 5a can be further suppressed. However, the present disclosure is not limited to this example, and θa≤θr may be satisfied.

In other words, in FIG. 3A, the first peripheral surface 51a extends from one circumferential direction Rb to the other circumferential direction Rd toward the upper side from the lower end of the peripheral wall recess 5a. In the first example, the first peripheral surface 51a is a flat surface tilted in the other circumferential direction Rd toward the upper side. Since the first peripheral surface 51a is the flat surface as described above, an opening area of the peripheral wall recess 5a as viewed from the radial direction can be increased while increasing the acute angle θa of the first peripheral surface 51a. Accordingly, more airflows can be flowed radially inside of the peripheral wall part 35 through the peripheral wall recess 5a, and the stator 22 of the motor 2, the electronic component 41 mounted on the substrate 4, and the like can be cooled by the airflows.

In other words, in FIG. 3A, the second peripheral surface 52a extends from the lower end of the peripheral wall recess 5a. In the first example, the second peripheral surface 52a is a flat surface tilted in one circumferential direction Rb toward the upper side. Since the second peripheral surface 52a is the flat surface as described above, an opening area in the circumferential direction of the peripheral wall recess 5a as viewed from the radial direction can be increased while increasing the acute angle φa of the second peripheral surface 52a. Accordingly, more airflows can be flowed radially inside of the peripheral wall part 35 through the peripheral wall recess 5a, and the stator 22 of the motor 2, the electronic component 41 mounted on the substrate 4, and the like can be cooled by the airflows.

As shown in FIG. 3B, the peripheral wall recess 5*b* according to the second example is an arc-shaped notch as viewed from the radial direction. The arc shape may be, for example, a semicircular shape, but is preferably an arc shape having a central angle of less than 180 degrees. The first and second peripheral surfaces 51*b* and 52*b* each have an arc shape when viewed from the radial direction, and are curved in opposite directions in the circumferential direction.

The lower end portion of the first peripheral surface 51*b* is preferably smoothly connected to the lower end portion of the second peripheral surface 52*b*. That is, the tangent line to the first peripheral surface 51*b* at the lower end of the first peripheral surface 51*b* is preferably parallel to the tangent line to the second peripheral surface 52*b* at the lower end of the second peripheral surface 52*b*.

As shown in FIG. 3B, in the entire first peripheral surface 51*b*, the tilt direction of the first peripheral surface 51*b* is perpendicular to the normal and radial directions of the first peripheral surface 51*b*. The acute angle made by the tilt direction of the first peripheral surface 51*b* with the axial direction is preferably greater than the acute angle θr made by the moving blade 11 with the axial direction. The tilt direction of the first peripheral surface 51*b* is an extending direction of the tangent line to the first peripheral surface 51*b* at each point on the first peripheral surface 51*b*. The acute angle made by the tilt direction of the first peripheral surface 51*b* with the axial direction is a tilt angle of the tangent line with respect to the axial direction in the entire first peripheral surface 51*b*, and includes the acute angle θb at the upper end of the first peripheral surface 51*b*. The acute angle θr of the moving blade 11 is a so-called lead angle as described above. Since the acute angle in the entire first peripheral surface 51*b* is greater than the acute angle θr of the moving blade 11, the airflow hitting against the first peripheral surface 51*b* is likely to flow more smoothly along the first peripheral surface 51*b*. Therefore, the generation of noise due to the airflow flowing into the peripheral wall recess 5*b* can be further suppressed. However, the present disclosure is not limited to this example, and, in at least a part of the first peripheral surface 51*b*, the acute angle made by the tilt direction of the first peripheral surface 51*b* with the axial direction may be equal to or smaller than the acute angle θr of the moving blade 11.

In other words, the first peripheral surface 51*b* extends from one circumferential direction Rb to the other circumferential direction Rd toward the upper side from the lower end of the peripheral wall recess 5*b*. As shown in FIG. 3B, the first peripheral surface 51*b* is preferably a curved surface that is curved downward as viewed from the radial direction and in the other circumferential direction Rd. Since the first peripheral surface 51*b* is the curved surface as described above, it is made easier to increase the acute angle θb made by the direction perpendicular to the normal and radial directions of the first peripheral surface 51*b* with the axial direction in the entire first peripheral surface 51*b*. Accordingly, since the airflow hitting against the first peripheral surface 51*b* easily flows smoothly along the first peripheral surface 51*b*, the generation of noise can be suppressed. However, the present disclosure is not limited to the example shown in FIG. 3B, but the first peripheral surface 51*b* may be a curved surface that is curved upward as viewed from the radial direction and in one circumferential direction Rb.

In other words, the second peripheral surface 52*b* extends from the lower end of the peripheral wall recess 5*b*. The second peripheral surface 52*b* is preferably a curved surface that is curved downward as viewed from the radial direction and from the other circumferential direction Rd to one circumferential direction Rb. Since the second peripheral surface 52*b* is the curved surface as described above, it is made easier to increase the acute angle made by the direction perpendicular to the normal and radial directions of the second peripheral surface 52*b* with the axial direction in the entire second peripheral surface 52*b*. Therefore, since the airflow easily flows smoothly along the second peripheral surface 52*b*, the generation of noise can be suppressed. However, the present disclosure is not limited to this example, but the second peripheral surface 52*b* may be a curved surface that is curved upward as viewed from the radial direction and from one circumferential direction Rb to the other circumferential direction Rd.

In the second example, the tilt direction of the second peripheral surface 52*b* is an extending direction of the tangent line to the second peripheral surface 52*b* at each point on the second peripheral surface 52*b*. The acute angle made by the tilt direction of the second peripheral surface 52*b* with the axial direction is a tilt angle of the tangent line with respect to the axial direction in the entire second peripheral surface 52*b*, and includes an acute angle φb at the upper end of the second peripheral surface 52*b*.

Figure 4A:
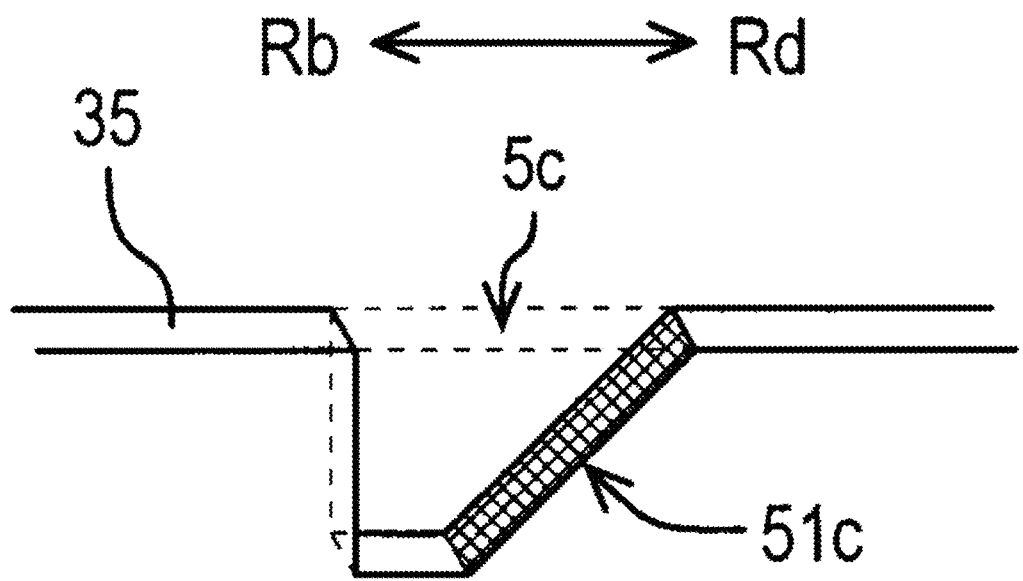
FIG. 4A is a perspective view showing a peripheral wall recess according to another configuration of the first example of an example embodiment of the present disclosure.
Figure 4B:
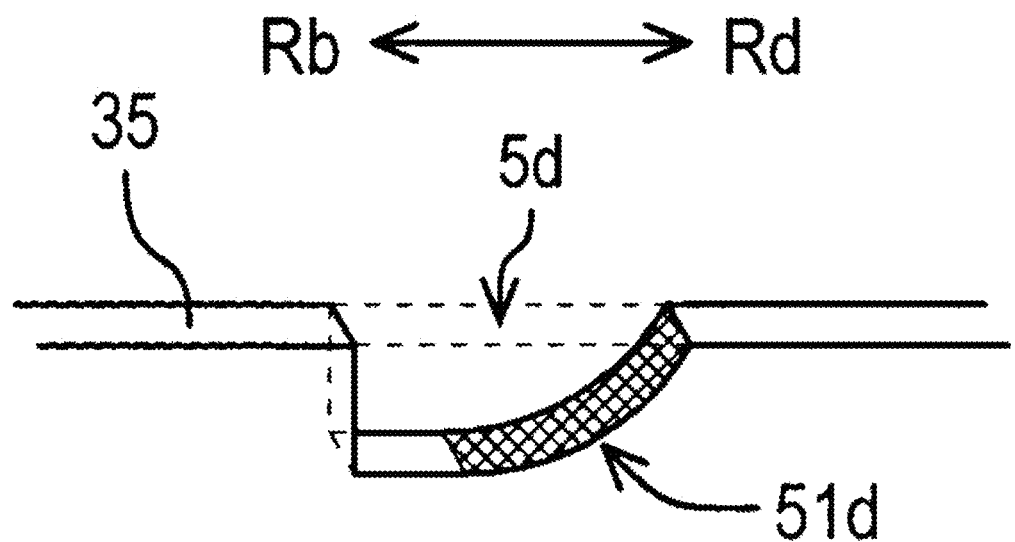
FIG. 4B is a perspective view showing a peripheral wall recess according to another configuration of the second example of an example embodiment of the present disclosure.

Next, with reference to FIGS. 4A and 4B, peripheral wall recesses 5*c* and 5*d* according to another configuration of the first and second examples will be described. FIG. 4A is a perspective view showing the peripheral wall recess 5*c* according to another configuration of the first example. FIG. 4B is a perspective view showing the peripheral wall recess 5*d* according to another configuration of the second example. In FIGS. 4A and 4B, the moving blade 11 and the peripheral wall recesses 5*c* and 5*d* are viewed from the radial direction and from above.

In the peripheral wall recesses 5*c* and 5*d* according to other configurations of the first and second examples, the other circumferential side surface facing in the rotation direction Rd is a flat surface parallel to the axial direction as viewed from the radial direction as shown in FIGS. 4A and 4B. Noise generated around first peripheral surfaces 51*c* and 51*d* of the peripheral wall recesses 5*c* and 5*d* is larger than noise generated around the other circumferential side surfaces of the peripheral wall recesses 5*c* and 5*d*. Therefore, even if only the first peripheral surfaces 51*c* and 51*d* are provided in the peripheral wall recesses 5*c* and 5*d*, the generation of noise due to airflows flowing into the peripheral wall recesses 5*c* and 5*d* can be suppressed.

In FIGS. 4A and 4B, the first peripheral surfaces 51*c* and 51*d* are each an example of the "first peripheral surface" of the present disclosure.

Next, peripheral wall recesses 5*e* and 5*f* according to a first modified example of the first and second examples will be described. In the first modified example, description is given of a configuration different from the peripheral wall recesses 5*a*, 5*b*, 5*c*, and 5*d* according to the first and second examples described above. The same constituents as the peripheral wall recesses 5*a* to 5*d* according to the first and second examples are denoted by the same reference numerals, and description thereof may be omitted.

Figure 5A:
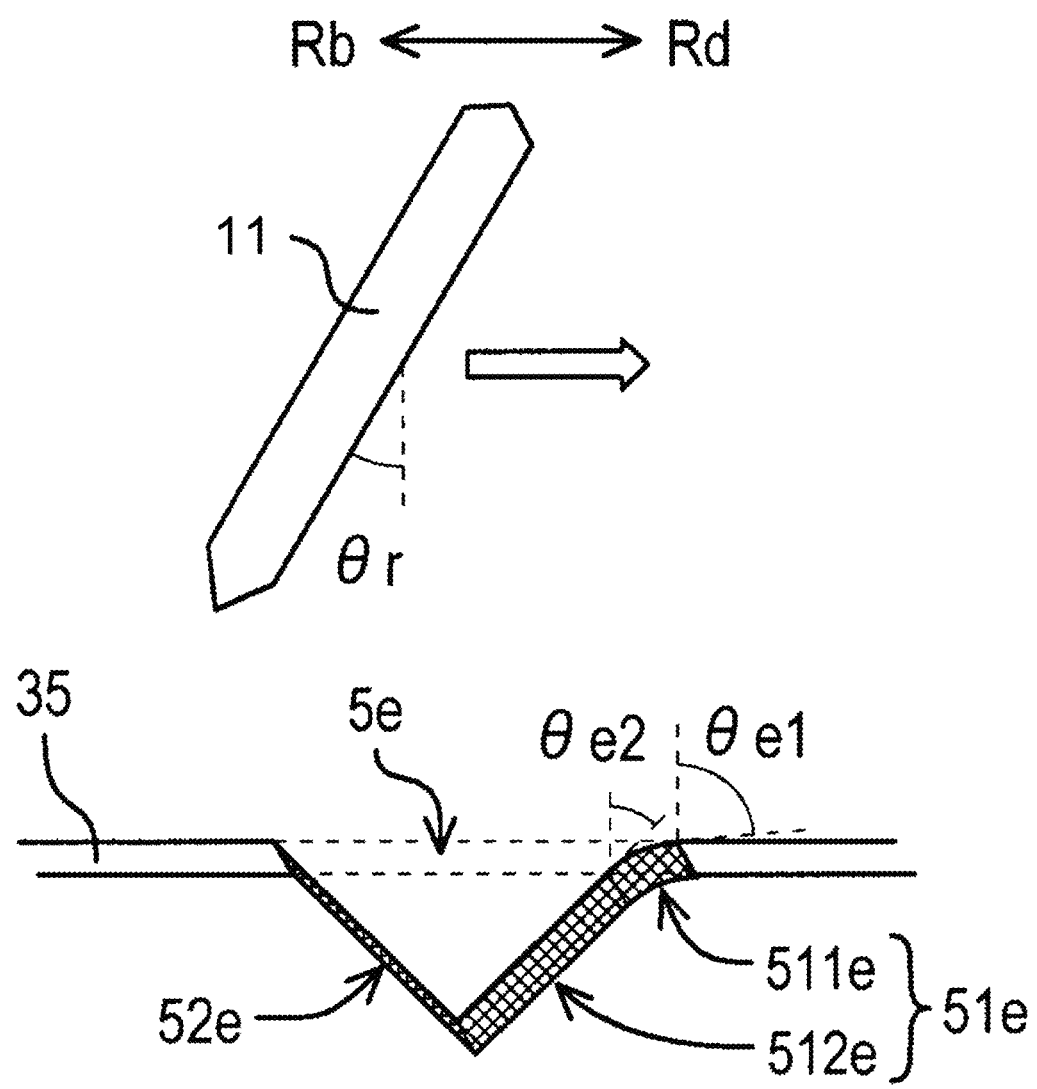
FIG. 5A is a perspective view showing a peripheral wall recess according to a first modified example of the first example embodiment of the present disclosure.
Figure 5B:
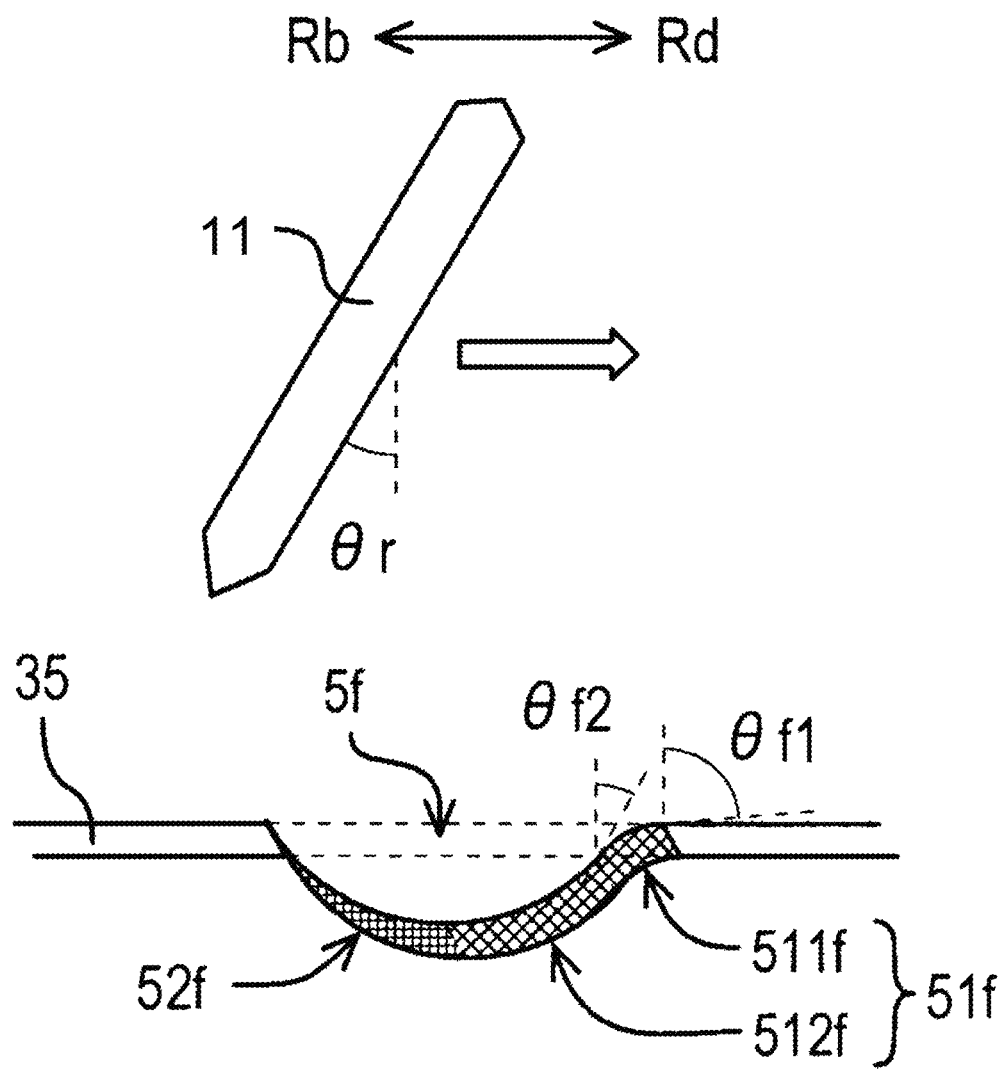
FIG. 5B is a perspective view showing a peripheral wall recess according to a first modified example of the second example embodiment of the present disclosure.

FIG. 5A is a perspective view showing the peripheral wall recess 5*e* according to the first modified example of the first example. FIG. 5B is a perspective view showing the peripheral wall recess 5*f* according to the first modified example of the second example. In FIGS. 5A and 5B, the moving blade 11 and the peripheral wall recesses 5*e* and 5*f* are viewed from the radial direction and from above.

As shown in FIGS. 5A and 5B, in the first modified example of the first and second examples, first peripheral surfaces 51*e* and 51*f* include first region surfaces 511*e* and 511*f* extending from the upper ends of the peripheral wall recesses 5*e* and 5*f* and second region surfaces 512*e* and 512*f* extending from lower ends of the first region surfaces 511*e* and 511*f*. The first region surfaces 511*e* and 511*f* are curved surfaces that are curved upward as viewed from the radial direction and toward one circumferential direction Rb. The first tilt direction of the first region surfaces 511*e* and 511*f* is perpendicular to the normal and radial directions of the first region surfaces 511*e* and 511*f* at the upper ends of the first region surfaces 511*e* and 511*f*. The second tilt direction of the second region surfaces 512*e* and 512*f* is perpendicular to the normal and radial directions of the second region surfaces 512*e* and 512*f* at the upper ends of the second region surfaces 512*e* and 512*f*. The first region surfaces 511*e* and 511*f* can be provided by scraping the corners formed by the first peripheral surfaces 51*e* and 51*f* and the upper surface of the peripheral wall part 35. That is, the first region surfaces 511*e* and 511*f* can be provided at the corners by performing so-called round chamfering on the corners.

In the first modified example of the first and second examples, first acute angles θe1 and θf1 made by the first tilt directions of the first region surfaces 511*e* and 511*f* with the axial direction are preferably greater than second acute angles θe2 and θf2 made by the second tilt directions of the second region surfaces 512*e* and 512*f* with the axial direction. Since the first acute angles θe1 and θf1 of the first region surfaces 511*e* and 511*f* are greater than the second acute angles θe2 and θf2 of the second region surfaces 512*e* and 512*f*, it is made easier for airflows hitting against the first region surfaces 511*e* and 511*f* to flow more smoothly along the first region surfaces 511*e* and 511*f*. At least some of the airflows flowing along the first region surfaces 511*e* and 511*f* can be smoothly released to the upper surface of the peripheral wall part 35. Accordingly, it is possible to further suppress the generation of noise due to the airflows flowing into the peripheral wall recesses 5*e* and 5*f*. However, the present disclosure is not limited to this example, and θe1≤θe2 or θf1≤θf2 may be satisfied.

The second acute angles θe1 and θf1 are preferably greater than the acute angle θr made by the moving blade 11 with the axial direction. Since the second acute angles θe2 and θf2 of the second region surfaces 512*e* and 512*f* are greater than the acute angle θr of the moving blade, it is made easier for airflows hitting against the second region surfaces 512*e* and 512*f* to flow more smoothly along the second region surfaces 512*e* and 512*f*. Therefore, it is possible to more effectively suppress the generation of noise due to the airflows flowing into the peripheral wall recesses 5*e* and 5*f*. However, the present disclosure is not limited to this example, and θe2≤θr or θf2≤θr may be satisfied.

As shown in FIG. 5A, in the first modified example of the first example, the second region surface 512*e* extends, in other words, from one circumferential direction Rb to the other circumferential direction Rd toward the upper side from the lower end of the peripheral wall recess 5*e*. As described above, the first peripheral surface 51*e* includes the second region surface 512*e*. The second region surface 512*e* is a flat surface tilted in the other circumferential direction Rd toward the upper side. Since the second region surface 512*e* is the flat surface as described above, an opening area in the circumferential direction of the peripheral wall recess 5*e* as viewed from the radial direction can be increased while increasing the second acute angle θe2 of the second region surface 512*e*. Therefore, more airflows can be flowed radially inside of the peripheral wall part 35 through the peripheral wall recess 5*e* to cool the stator 22 of the motor 2, the electronic component 41 mounted on the substrate 4, and the like.

As shown in FIG. 5B, in the first modified example of the second example, the second region surface 512*f* extends, in other words, from one circumferential direction Rb to the other circumferential direction Rd toward the upper side from the lower end of the peripheral wall recess 5*f*. As described above, the first peripheral surface 51*f* includes the second region surface 512*f*. The second region surface 512*f* is preferably a curved surface that is curved downward as viewed from the radial direction and toward the other circumferential direction Rd. Since the second region surface 512*f* is the curved surface as described above, it is made easier to increase the acute angle made by the direction perpendicular to the normal and radial directions of the second region surface 512*f* with the axial direction in the entire second region surface 512*f*. Therefore, since the airflow hitting against the second region surface 512*f* more easily flows smoothly along the second region surface 512*f*, the generation of noise can be suppressed. The second region surface 512*f* is not limited to the example shown in FIG. 5B, but may be a curved surface that is curved upward as viewed from the radial direction and toward one circumferential direction Rb.

In FIGS. 5A and 5B, the second peripheral surfaces 52*e* and 52*f* of the peripheral wall recesses 5*e* and 5*f* are the other circumferential side surfaces extending from one circumferential direction Rb to the other circumferential direction Rd toward the lower side from the upper ends of the peripheral wall recesses 5*e* and 5*f*. However, the present disclosure is not limited to the examples shown in FIGS. 5A and 5B, but the other circumferential side surfaces facing in the rotation direction Rd of the peripheral wall recesses 5*e* and 5*f* do not have to extend from one circumferential direction Rb to the other circumferential direction Rd toward the lower side and may be flat surfaces parallel to the axial direction as viewed from the radial direction as in the case of FIGS. 4A and 4B, for example.

The present disclosure is not limited to the examples shown in FIGS. 5A and 5B, but the corner portions formed by the second peripheral surfaces 52*e* and 52*f* and the upper surface of the peripheral wall part 35 may be subjected to so-called round chamfering or so-called C beveling to obliquely cut off the corners of the corner portions. Such chamfering of the corner portions makes it possible to further suppress the generation of noise due to the airflows along the second peripheral surfaces 52*e* and 52*f* flowing into the peripheral wall recesses 5*e* and 5*f*.

In the first modified example of the first and second examples, the first peripheral surfaces 51*e* and 51*f* are each an example of the "first peripheral surface" of the present disclosure. The first region surfaces 511*e* and 511*f* are each an example of the "first surface" of the present disclosure. The second region surfaces 512*e* and 512*f* are each an example of the "second surface" of the present disclosure. The second peripheral surfaces 52*e* and 52*f* are each an example of the "second peripheral surface" of the present disclosure.

Next, peripheral wall recesses 5*g* and 5*h* according to a second modified example of the first and second examples will be described. In the second modified example, description is given of a configuration different from the peripheral wall recesses 5*a* to 5*d* according to the first and second examples described above and the peripheral wall recesses 5*e* and 5*f* according to the first modified example thereof. The same constituents as the peripheral wall recesses 5*a* to 5d according to the first and second examples described above and the peripheral wall recesses 5e and 5f according to the first modified example thereof are denoted by the same reference numerals, and description thereof may be omitted.

Figure 6A:
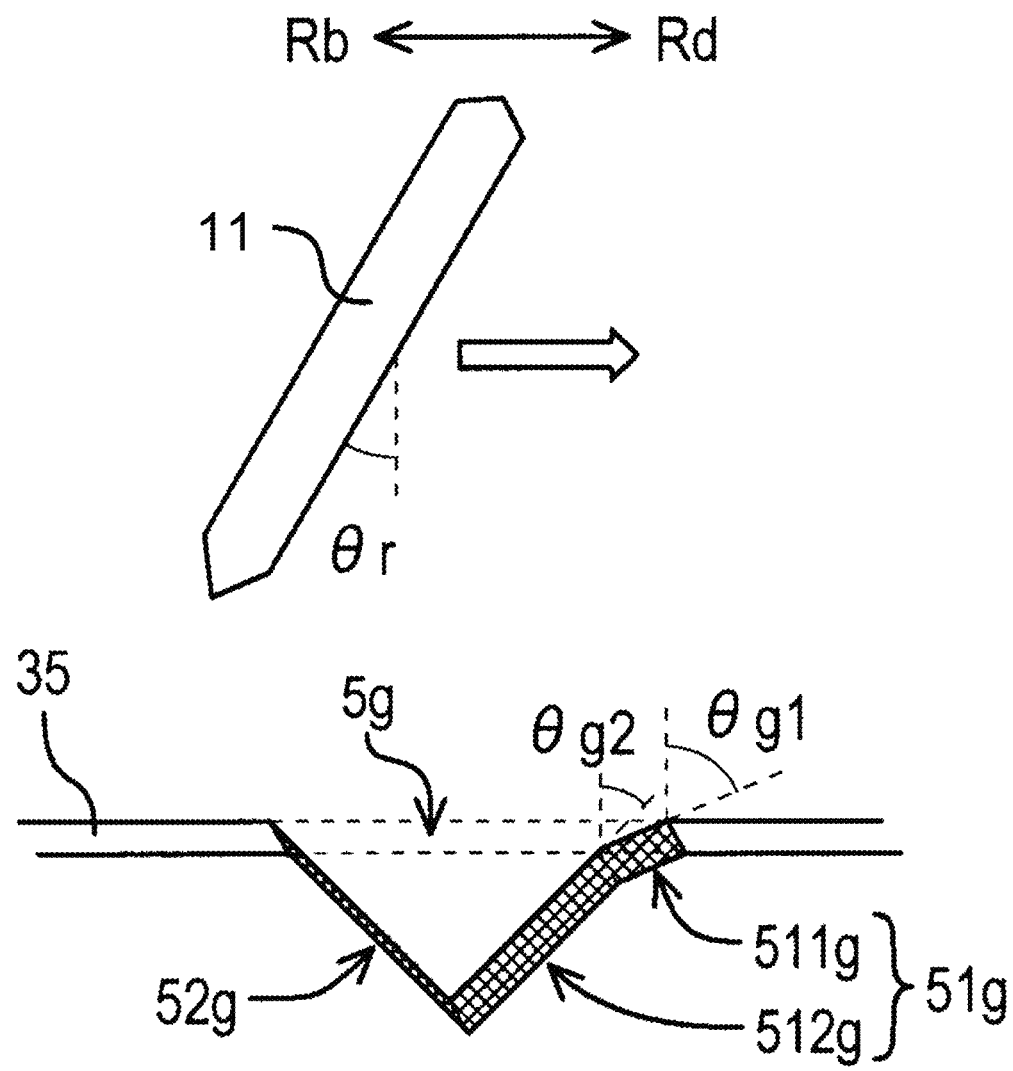
FIG. 6A is a perspective view showing a peripheral wall recess according to a second modified example of the first example embodiment of the present disclosure.
Figure 6B:
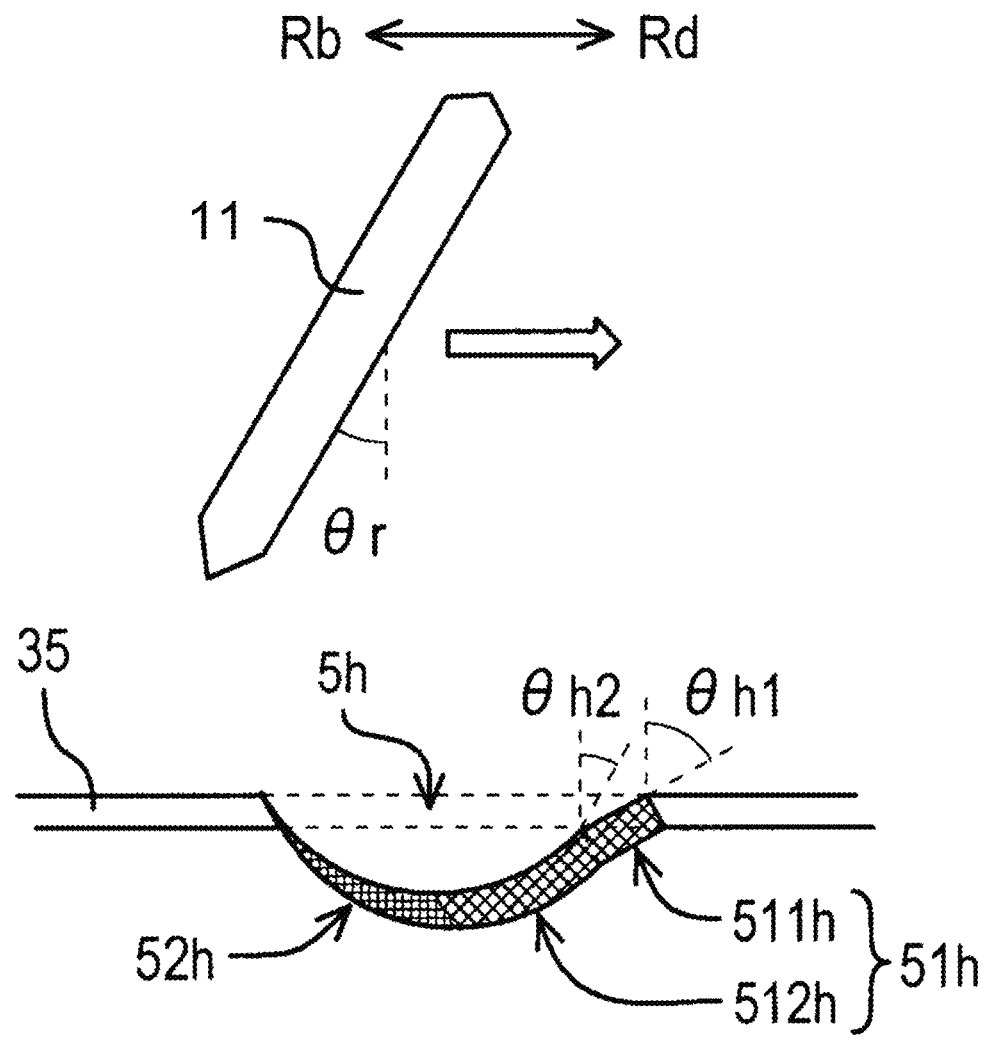
FIG. 6B is a perspective view showing a peripheral wall recess according to a second modified example of the second example embodiment of the present disclosure.

FIG. 6A is a perspective view showing the peripheral wall recess 5g according to the second modified example of the first example. FIG. 6B is a perspective view showing the peripheral wall recess 5h according to the second modified example of the second example. In FIGS. 6A and 6B, the moving blade 11 and the peripheral wall recesses 5g and 5h are viewed from the radial direction and from above.

As shown in FIGS. 6A and 6B, in the second modified example of the first and second examples, the first peripheral surfaces 51g and 51h include first region surfaces 511g and 511h extending downward from upper ends of the peripheral wall recesses 5g and 5h and second region surfaces 512g and 512h extending downward from lower ends of the first region surfaces 511g and 511h. The first region surfaces 511g and 511h are flat surfaces tilted from the other circumferential direction Rd to one circumferential direction Rb toward the lower side from the upper ends of the peripheral wall recesses 5g and 5h. A second tilt direction of the second region surfaces 512g and 512h is perpendicular to the normal and radial directions of the second region surfaces 512g and 512h at the upper ends of the second region surfaces 512g and 512h. The first region surfaces 511g and 511h can be provided by obliquely cutting off the corners of corner portions formed by the first peripheral surfaces 51g and 51h and the upper surface of the peripheral wall part 35. That is, by providing the first peripheral surfaces 51g and 51h, so-called C beveling can be performed on the corner portions.

In the second modified example of the first and second examples, first acute angles θg1 and θh1 made by the first region surfaces 511g and 511h with the axial direction are preferably greater than second acute angles θg2 and θh2 made by the second tilt direction of the second region surfaces 512g and 512h with the axial direction. Since the first acute angles θg1 and θh1 of the first region surfaces 511g and 511h are greater than the second acute angles θg2 and θh2 of the second region surfaces 512g and 512h, it is made easier for airflows hitting against the first region surfaces 511g and 511h to flow more smoothly along the first region surfaces 511g and 511h. At least some of the airflows flowing along the first region surfaces 511g and 511h can be smoothly released to the upper surface of the peripheral wall part 35. Therefore, it is possible to further suppress the generation of noise due to the airflows flowing into the peripheral wall recesses 5g and 5h. However, the present disclosure is not limited to this example, and θg1≤θg2 or θh1≤θh2 may be satisfied.

The second acute angles θg2 and θh2 are preferably greater than the acute angle θr made by the moving blade 11 with the axial direction. Since the second acute angles θg2 and θh2 of the second region surfaces 512g and 512h are greater than the acute angle θr of the moving blade 11, it is made easier for the airflows hitting against the second region surfaces 512g and 512h to flow more smoothly along the second region surfaces 512g and 512h. Therefore, it is possible to more effectively suppress the generation of noise due to the airflows flowing into the peripheral wall recesses 5g and 5h. However, the present disclosure is not limited to this example, and θg2≤θr or θh2≤θr may be satisfied.

In the second modified example of the first example, as shown in FIG. 6A, the second region surface 512g is a flat surface tilted to the other circumferential direction Rd toward the upper side from the lower end of the peripheral wall recess 5g. In the second modified example of the second example, the second region surface 512h is a curved surface extending from one circumferential direction Rb to the other circumferential direction Rd toward the upper side from the lower end of the peripheral wall recess 5h. As shown in FIG. 6B, the curved surface is preferably curved downward as viewed from the radial direction and toward the other circumferential direction Rd. However, the second region surface 512h is not limited to this example, but may be a curved surface that is curved upward as viewed from the radial direction and toward one circumferential direction Rb.

In FIGS. 6A and 6B, the second peripheral surfaces 52g and 52h of the peripheral wall recesses 5g and 5h are the other circumferential side surfaces extending from one circumferential direction Rb to the other circumferential direction Rd toward the lower side from the upper ends of the peripheral wall recesses 5g and 5h. However, the present disclosure is not limited to the examples shown in FIGS. 6A and 6B, and the other circumferential side surfaces of the peripheral wall recesses 5g and 5h facing the rotation direction Rd do not have to extend from one circumferential direction Rb to the other circumferential direction Rd toward the lower side, but may be flat surfaces parallel to the axial direction as viewed from the radial direction, as in the case of FIGS. 4A and 4B, for example.

The present disclosure is not limited to the examples shown in FIGS. 6A and 6B, but the corner portions formed by the second peripheral surfaces 52g and 52h and the upper surface of the peripheral wall part 35 may be subjected to so-called round chamfering or so-called C beveling. Such chamfering of the corner portions makes it possible to further suppress the generation of noise due to the airflows along the second peripheral surfaces 52g and 52h flowing into the peripheral wall recess 5.

In the second modified example of the first and second examples, the first peripheral surfaces 51g and 51h are each an example of the "first peripheral surface" of the present disclosure. The first region surfaces 511g and 511h are each an example of the "first surface" of the present disclosure. The second region surfaces 512g and 512h are each an example of the "second surface" of the present disclosure. The second peripheral surfaces 52g and 52h are each an example of the "second peripheral surface" of the present disclosure.

Next, peripheral wall recesses 5i and 5j according to a third modified example will be described. In the third modified example, description is given of a configuration different from the peripheral wall recesses 5a to 5d according to the first and second examples described above and the peripheral wall recesses 5e to 5h according to the first and second modified examples. The same constituents as the peripheral wall recesses 5a to 5d according to the first and second examples described above and as the peripheral wall recesses 5e to 5h according to the first and second modified examples may be denoted by the same reference numerals, and description thereof may be omitted.

Figure 7A:
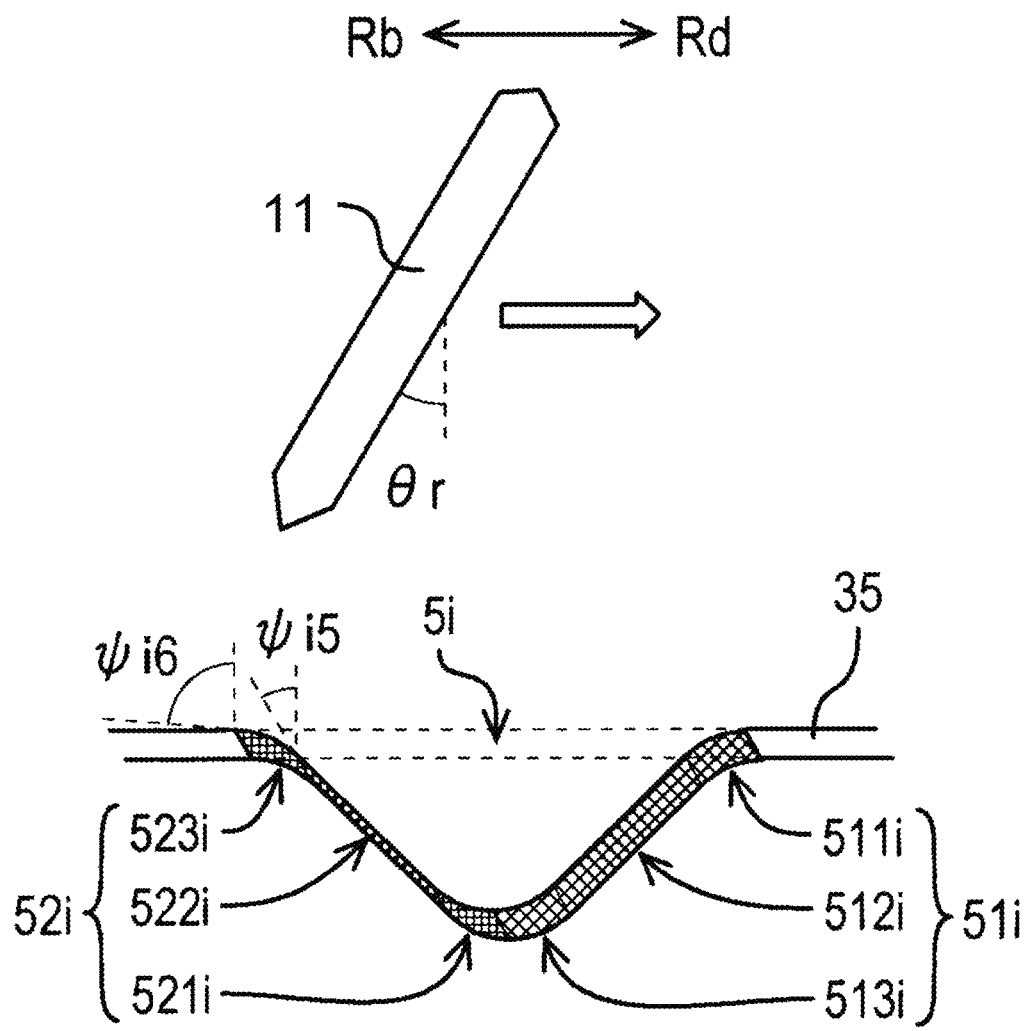
FIG. 7A is a perspective view showing a peripheral wall recess according to a third modified example of the first example embodiment of the present disclosure.
Figure 7B:
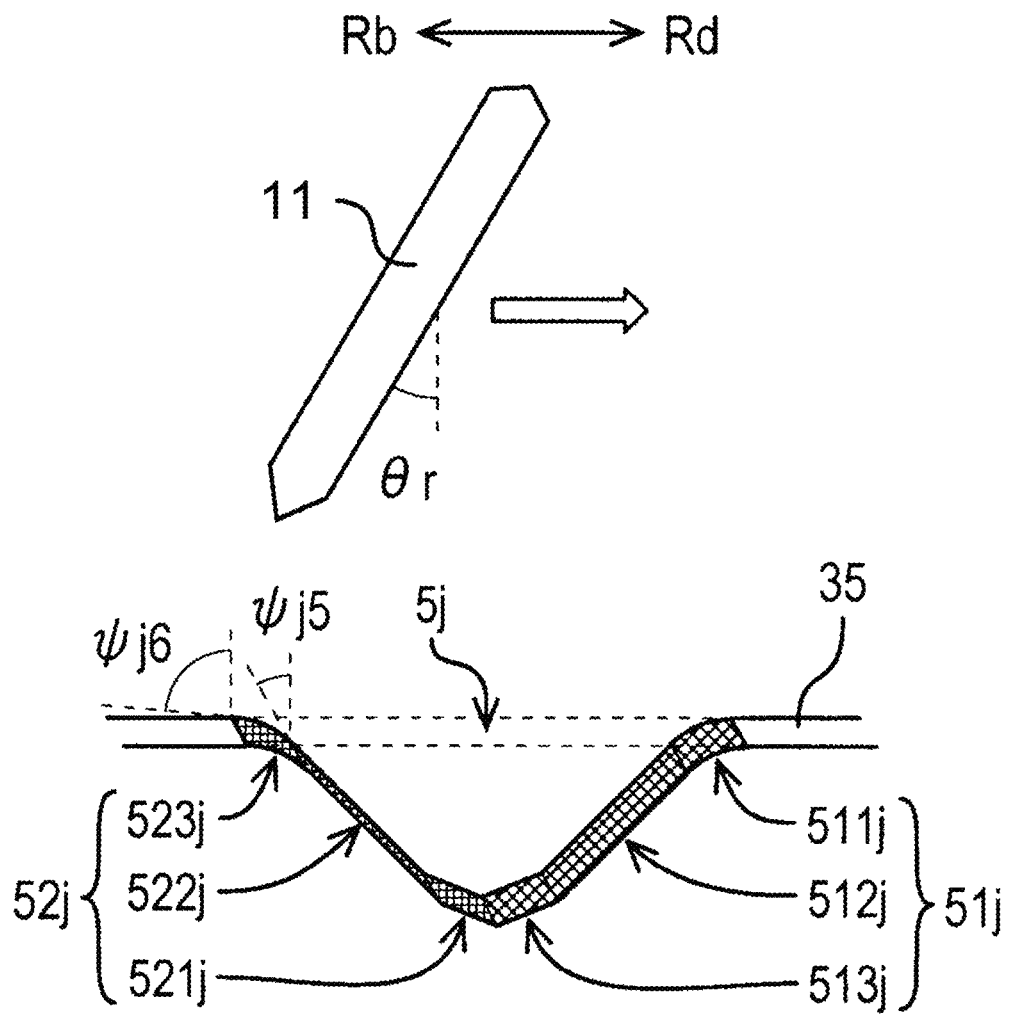
FIG. 7B is a perspective view showing a peripheral wall recess according to another configuration of the third modified example of the first example embodiment of the present disclosure.

FIG. 7A is a perspective view showing the peripheral wall recess 5i according to the third modified example of the first example. FIG. 7B is a perspective view showing the peripheral wall recess 5j according to another configuration of the third modified example of the first example. In FIGS. 7A and 7B, the moving blade 11 and the peripheral wall recesses 5i and 5j are viewed from the radial direction and from above.

As shown in FIGS. 7A and 7B, in the third modified example, the first peripheral surfaces 51i and 51j of the peripheral wall recesses 5i and 5j further include third region surfaces 513i and 513j, in addition to the first region surfaces 511*i* and 511*j* and the second region surfaces 512*i* and 512*j*. The third region surfaces 513*i* and 513*j* extend from one circumferential direction Rb to the other circumferential direction Rd toward the upper side from lower ends of the peripheral wall recesses 5*i* and 5*j*. The third region surfaces 513*i* and 513*j* have their upper ends connected to the lower ends of the second region surfaces 512*i* and 512*j*.

As shown in FIG. 7A, the third region surface 513*i* may be a curved surface that is curved downward as viewed from the radial direction and toward the other circumferential direction Rd. Since the third region surface 513*i* is such a curved surface, it is made easier to increase the acute angle made by the direction perpendicular to the normal and radial directions of the third region surface 513*i* with the axial direction in the entire third region surface 513*i*. Accordingly, since the airflow hitting against the third region surface 513*i* easily flows smoothly along the third region surface 513*i*, the generation of noise can be suppressed.

Alternatively, as shown in FIG. 7B, the third region surface 513*i* may be a flat surface tilted in the other circumferential direction Rd toward the upper side. Since the third region surface 513*i* is the flat surface as described above, an opening area in the circumferential direction of the peripheral wall recess 5*i* as viewed from the radial direction can be increased while increasing the acute angle made by the third region surface 513*i* with the axial direction. Therefore, more airflows can be flowed radially inside of the peripheral wall part 35 through the peripheral wall recess 5*i* to cool the stator 22 of the motor 2, the electronic component 41 mounted on the substrate 4, and the like.

As shown in FIGS. 7A and 7B, in the third modified example of the peripheral wall recesses 5*i* and 5*j*, the second peripheral surfaces 52*i* and 52*j* include fourth region surfaces 521*i* and 521*j* extending from the lower ends of the peripheral wall recesses 5*i* and 5*j*. As shown in FIG. 7A, the fourth region surface 521*i* may be a curved surface that is curved downward as viewed from the radial direction and from the other circumferential direction Rd to one circumferential direction Rb. Since the fourth region surface 521*i* is such a curved surface, it is made easier to increase the acute angle made by the direction perpendicular to the normal and radial directions of the fourth region surface 521*i* with the axial direction in the entire fourth region surface 521*i*. Therefore, since the airflow easily flows smoothly along the fourth region surface 521*i*, the generation of noise can be suppressed.

Alternatively, as shown in FIG. 7B, the fourth region surface 521*j* may be a flat surface tilted in one circumferential direction Rb toward the upper side. Since the fourth region surface 521*j* is the flat surface as described above, an opening area in the circumferential direction of the peripheral wall recesses 5*i* and 5*j* as viewed from the radial direction can be further increased while increasing the acute angle made by the fourth region surface 521*j* with the axial direction. Therefore, more airflows can be flowed radially inside of the peripheral wall part 35 through the peripheral wall recess 5*i* and 5*j* to cool the stator 22 of the motor 2, the electronic component 41 mounted on the substrate 4, and the like.

The second peripheral surfaces 52*i* and 52*j* further include fifth region surfaces 522*i* and 522*j* and sixth region surfaces 523*i* and 523*j*.

The fifth region surfaces 522*i* and 522*j* have their lower ends connected to the upper ends of the fourth region surfaces 521*i* and 521*j*. The fifth region surfaces 522*i* and 522*j* have their upper ends connected to the lower ends of the sixth region surfaces 523*i* and 523*j*. In FIG. 7A and FIG. 7B, the fifth region surfaces 522*i* and 522*j* are flat surfaces tilted in one circumferential direction Rb toward the upper side from the upper ends of the fourth region surfaces 521*i* and 521*j* as viewed from the radial direction. However, the fifth region surfaces 522*i* and 522*j* are not limited to the examples illustrated in FIGS. 7A and 7B, but may be curved surfaces that are curved downward and toward one circumferential direction Rb or a curved surface that is curved upward and toward the other circumferential direction Rd as viewed from the radial direction. The tilt directions of the fifth region surfaces 522*i* and 522*j* are perpendicular to the normal and radial directions of the fifth region surfaces 522*i* and 522*j* at the upper ends of the fifth region surfaces 522*i* and 522*j*.

The sixth region surfaces 523*i* and 523*j* extend from the upper ends of the peripheral wall recesses 5*i* and 5*j*. The sixth region surfaces 523*i* and 523*j* are curved surfaces that are curved upward as viewed from the radial direction and toward the other circumferential direction Rd. The tilt directions of the sixth region surfaces 523*i* and 523*j* are perpendicular to the normal and radial directions of the sixth region surfaces 523*i* and 523*j* at the upper ends of the sixth region surfaces 523*i* and 523*j*. The sixth region surfaces 523*i* and 523*j* can be provided by cutting off the corners of corner portions formed by the second peripheral surfaces 52*i* and 52*j* and the upper surface of the peripheral wall part 35. More specifically, the sixth region surfaces 523*i* and 523*j* can be provided at the corner portions by performing so-called round chamfering on the corner portions. The tilt directions of the sixth region surfaces 523*i* and 523*j* are perpendicular to the normal and radial directions of the sixth region surfaces 523*i* and 523*j* at the upper ends of the sixth region surfaces 523*i* and 523*j*.

The sixth region surfaces 523*i* and 523*j* are not limited to the examples shown in FIGS. 7A and 7B, but may be flat surfaces tilted from one circumferential direction Rb to the other circumferential direction Rd toward the lower side from the upper ends of the peripheral wall recesses 5*i* and 5*j*. In this case, the sixth region surfaces 523*i* and 523*j* can be provided by obliquely cutting off the corners of the corner portions formed by the second peripheral surfaces 52*i* and 52*j* and the upper surface of the peripheral wall part 35. More specifically, by providing the sixth region surfaces 523*i* and 523*j*, the corner portions can be subjected to so-called C beveling.

Next, acute angles $\varphi i5$ and $\varphi j5$ made by the tilt directions of the fifth region surfaces 522*i*, 522*j* with the axial direction and acute angles $\varphi i6$ and $\varphi j6$ made by the tilt directions of the sixth region surfaces 523*i* and 523*j* at the upper ends of the sixth region surfaces 523*i* and 523*j* with the axial direction are preferably greater than the acute angle $\theta r$ made by the moving blade 11 with the axial direction. Since the acute angles $\varphi i5$ and $\varphi j5$ of the fifth region surfaces 522*i* and 522*j* and the acute angles $\varphi i6$ and $\varphi j6$ of the sixth region surfaces 523*i* and 523*j* are greater than the acute angle $\theta r$ of the moving blade 11, it is made easier for the airflows to flow more smoothly along the fifth region surfaces 522*i* and 522*j* and the sixth region surfaces 523*i* and 523*j*. Therefore, it is possible to more effectively suppress the generation of noise due to the airflows flowing into the peripheral wall recesses 5*i* and 5*j*. However, the present disclosure is not limited to this example, and the acute angles $\varphi i5$ and $\varphi j5$ and the acute angles $\varphi i6$ and $\varphi j6$ may be equal to or smaller than the acute angle $\theta r$ made by the moving blade 11 with the axial direction.

In the third modified example of the peripheral wall recesses 5*i* and 5*j*, the first peripheral surfaces 51*i* and 51*j* are each an example of the "first peripheral surface" of the present disclosure. The first region surfaces 511*i* and 511*j* are each an example of the "first surface" of the present disclosure. The second region surfaces 512*i* and 512*j* are each an example of the "second surface" of the present disclosure. The third region surfaces 513*i* and 513*j* are each an example of the "third surface" of the present disclosure. The second peripheral surfaces 52*i* and 52*j* are each an example of the "second peripheral surface" of the present disclosure. The fourth region surfaces 521*i* and 521*j* are each an example of the "fourth surface" of the present disclosure.

The example embodiment of the present disclosure has been described above. The scope of the present disclosure is not limited to the example embodiment described above. The present disclosure can be implemented by making various changes to the example embodiment described above without departing from the spirit of the disclosure. The matters described in the above example embodiment can be appropriately combined without causing any contradiction.

The present disclosure is useful for a blower, for example, having a recess provided in a peripheral wall part of a housing.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A blower comprising:
   a moving blade rotatable about a central axis extending in a vertical direction;
   a motor to rotate the moving blade; and
   a housing surrounding the moving blade and the motor; wherein
   the housing includes a holding portion provided below the moving blade to hold the motor, and a peripheral wall portion having a cylindrical shape centered on the central axis and extending upward from a radially outer end portion of the holding portion;
   the peripheral wall portion includes a plurality of peripheral wall recesses that are recessed downward from an upper end of the peripheral wall portion and connects a space radially inside of the peripheral wall portion and a space radially outside of the peripheral wall portion;
   the plurality of peripheral wall recesses include a first peripheral surface that faces one circumferential direction that is opposite to a rotation direction of the moving blade, the first peripheral surface extending in the one circumferential direction from an upper end of the peripheral wall recess toward a lower side;
   the plurality of peripheral wall recesses are provided in the one circumferential direction; and
   intervals between the plurality of peripheral wall recesses adjacent to each other in the one circumferential direction are different.

2. The blower according to claim 1, wherein
   a tilt direction of the first peripheral surface is a direction perpendicular to normal and radial directions of the first peripheral surface; and
   an acute angle defined by the tilt direction of the first peripheral surface with an axial direction is greater than an acute angle defined by the moving blade with the axial direction.

3. The blower according to claim 1, wherein
   the first peripheral surface of each one of the plurality of peripheral wall recesses includes a first surface extending from the upper end of the peripheral wall recess and a second surface extending from a lower end of the first surface;
   the first surface is a curved surface that is curved upward and toward the one circumferential direction as viewed from a radial direction, and a first tilt direction of the first surface is perpendicular to normal and radial directions of the first surface at an upper end of the first surface;
   a second tilt direction of the second surface is perpendicular to normal and radial directions of the second surface at an upper end of the second surface; and
   a first acute angle defined by the first tilt direction with an axial direction is greater than a second acute angle defined by the second tilt direction with the axial direction.

4. The blower according to claim 3, wherein the second acute angle is greater than an acute angle defined by the moving blade with the axial direction.

5. The blower according to claim 3, wherein
   the first peripheral surface includes a third surface extending from the one circumferential direction to another circumferential direction toward an upper side from a lower end of the peripheral wall recess;
   the third surface includes an upper end connected to a lower end of the second surface; and
   the third surface is one of a curved surface that is curved downward as viewed from the radial direction and toward the another circumferential direction and a flat surface that is tilted to the another circumferential direction toward the upper side.

6. The blower according to claim 1, wherein
   the first peripheral surface of each one of the plurality of peripheral wall recesses includes a first surface extending from the upper end of the peripheral wall recess, and a second surface extending downward from a lower end of the first surface;
   the first surface is a flat surface tilted from another circumferential direction which is opposite to the one circumferential direction, toward the lower side from the upper end of the peripheral wall recess;
   a second tilt direction of the second surface is perpendicular to normal and radial directions of the second surface at an upper end of the second surface; and
   a first acute angle defined by the first surface with an axial direction is greater than a second acute angle defined by the second tilt direction with the axial direction.

7. The blower according to claim 1, wherein
   the plurality of peripheral wall recesses include a second peripheral surface facing in another circumferential direction that is a same direction as the rotation direction of the moving blade; and
   the second peripheral surface extends from the one circumferential direction to the another circumferential direction toward the lower side from the upper end of the peripheral wall recess.

8. The blower according to claim 7, wherein
   the second peripheral surface includes a lower surface extending from a lower end of the peripheral wall recess; and
   the lower surface is one of a curved surface that is curved downward and from the another circumferential direction to the one circumferential direction as viewed from a radial direction and a flat surface tilted in the one circumferential direction toward an upper side.

9. The blower according to claim 1, further comprising:
a substrate including electronic components disposed radially inside of the peripheral wall portion; wherein
the electronic components face the plurality of peripheral wall recesses in a radial direction.

* * * * *